US006542685B1

(12) United States Patent
Yoneda

(10) Patent No.: US 6,542,685 B1
(45) Date of Patent: Apr. 1, 2003

(54) TEMPERATURE INSENSITIVE OPTICAL WAVEGUIDES AND OPTICAL DEVICES USING THE SAME

(75) Inventor: Shigeru Yoneda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/543,762

(22) Filed: Apr. 5, 2000

(30) Foreign Application Priority Data

Apr. 5, 1999 (JP) .......................................... 11-097902
Apr. 4, 2000 (JP) ...................................... 2000-102402

(51) Int. Cl.⁷ ................................................ G02B 6/10
(52) U.S. Cl. ...................................... 385/130; 385/129
(58) Field of Search ......................... 385/130, 137.41, 385/42, 147; 501/7, 4, 10

(56) References Cited

U.S. PATENT DOCUMENTS

| 3,681,097 | A | * | 8/1972 | Beall ............................. 501/4 |
| 5,721,802 | A | * | 2/1998 | Francis et al. ............... 385/137 |
| 5,926,599 | A | * | 7/1999 | Bookbinder et al. ......... 385/137 |
| 6,087,280 | A | * | 7/2000 | Beall et al. ..................... 501/10 |
| 6,122,430 | A | * | 9/2000 | Bookbinder et al. ......... 385/137 |
| 6,400,884 | B1 | * | 6/2002 | Matano et al. ............... 385/137 |

FOREIGN PATENT DOCUMENTS

| JP | 2-208256 | 8/1990 |
| JP | 10-246824 | 9/1998 |
| WO | WO97/26572 | 7/1997 |

OTHER PUBLICATIONS

Japanese Office Action, dated Apr. 30, 2002, with English language translation of Japanese Examiner's comments.

Y. Kokubun et al., "Athermal Narrow–Band Optical Filter at 1.55μm Wavelength by Silica–Based Athermal Waveguide", IEICE Trans. Electron., vol. E81–C, No. 8, Aug. 1998, pp. 1187–1194.

Y. Inoue, et al., "Athermal Silica–Based Arrayed–Waveguide Grating Multiplexer", Electronic Letters, Nov. 6, 1997, vol. 33, No. 23.

H. Tanobe, et al., A Temperature Insensitive InGaAsP–InP Optical Filter, IEEE Photonics Technology Letters, vol. 8, No. 11, Nov. 1996.

Stuart E. Miller et al., "Optical Fiber Telecommunications", Academic Press, 1979.

* cited by examiner

*Primary Examiner*—Ellen E. Kim
(74) *Attorney, Agent, or Firm*—Whitham, Curtis and Christofferson, P.C.

(57) ABSTRACT

In order to obtain a temperature insensitive optical waveguide which is formed on a substrate and comprises a core and a cladding whose refractive index is less than that of said core, the substrate has a zero or negative coefficient of thermal expansion in the range between 0° C. and 65° C.

21 Claims, 13 Drawing Sheets

THERMAL EXPANSION OF DOPED SILICA GLASSES

FIG. 5 (PRIOR ART)

GLASS-CERAMIC ARTICLES
IN ZnO-Al$_2$O$_3$-SiO$_2$ COMPOSITION FIELD

| | | EXAMPLE No. | | | | | | | |
|---|---|---|---|---|---|---|---|---|---|
| | | 1 | 2 | 3 | 4 | 5 | 6 | 7 | 8 |
| COMPOSITION (wt.%) | SiO$_2$ | 57.6 | 60.9 | 56.3 | 60.1 | 59.0 | 54.0 | 57.6 | 50.0 |
| | Al$_2$O$_3$ | 17.1 | 14.1 | 16.2 | 19.7 | 18.8 | 23.0 | 17.1 | 13.0 |
| | ZnO | 25.3 | 25.0 | 27.5 | 20.2 | 22.2 | 23.0 | 25.3 | 37.0 |
| CRYSTALLIZING CONDITIONS (°C × TIME) | | 750×1 + 850×4 | 700×0.1 + 900×2 | 920×0.5 | 700×0.5 + 880×6 | 900×1 | 880×2 | 750×1 + 1100×1 | 750×1 + 950×1 |
| COEFFICIENT OF THERMAL EXPANSION (×10$^{-6}$/°C) | | -2.15 | -1.81 | -1.65 | -1.76 | -1.52 | -1.59 | 3.56 | 1.99 |

FIG. 6
(PRIOR ART)

SUBSTRATE MATERIALS
USABLE IN THE PRESENT INVENTION

| EXAMPLE OF MATERIAL | COEFFICIENT OF THERMAL EXPANSION ($\times 10^{-6}/°C$) |
|---|---|
| $LiO_2 - Al_2O_3 - 2SiO_2$ (Beta-eucryptite) | -8.6 |
| $Al_2O_3 - TiO_2$ (Aluminium Titanate) | -1.9 |
| CsCl | -1.2 |
| NEOCERAM N-0 (TRADE NAME) | -0.65 |
| MIRACRON PH-3 (REGISTERED TRADE MARK) | -0.2 |

MACH-ZEHNDER INTERFEROMETER

FABRY-PEROT
RESONATOR

TEMPERATURE INSENSITIVE OPTICAL WAVEGUIDES AND OPTICAL DEVICES USING THE SAME

BACKGROUND OF THE INVENTION

1. Field of the Invention

The present invention relates generally to optical waveguides and also to optical devices utilizing the same, both used in optical network system. More specifically, the present invention relates to technology for removing temperature dependence of the waveguide itself thereby rendering it unnecessary to use additional temperature compensating means.

2. Description of the Related Art

It is known in the art to utilize a DWDM (Dense Wavelength Division Multiplexing) so as to increase the capacity of data transmission in an optical fiber network system. In such a system, a wavelength filter plays an important role in splitting or combining light wavelengths. Such a filter however has encountered the difficulties that the passband thereof (viz., the central wavelength) is apt to undesirably shift because of ambient temperature change.

The fluctuation of the wavelength is caused by temperature dependence of optical path length of optical circuitry constituting the filter. More specifically, the temperature dependence of optical filter is affected by the temperature dependence of refractive index of a material of the waveguide (viz., dn/dT: n is refractive index, and T is temperature), and a linear expansion coefficient of the material. Generally, almost all of silica (quartz) glasses and semiconductors, each of which is typically used as a material of optical waveguide, exhibit positive values in terms of temperature coefficients of refractive index and coefficients of linear thermal expansion. Therefore, the temperature dependence of optical path length (viz., dS/dT: S is optical path length) also represents a positive value.

For example, as the temperature change of 1° C. occurs in a silica-based optical wavelength, the central wavelength of a filter changes about 0.01 nm, and this wavelength change corresponds to the central frequency change of about 1.3 GHz. Further, in the case of semiconductor-based optical waveguide, the temperature dependence thereof exhibits approximately, ten times compared with the above-mentioned silica-based waveguide.

In order to stabilize the aforesaid temperature characteristics, it is conceivable to add a precise temperature control device, to the waveguide. However, this technique has encountered the several difficulties that the manufacturing cost becomes high, the device being rendered bulky, and the reliability of the device being lowered.

A known approach to overcoming the above-mentioned problems is to cancel the temperature dependency of the device itself. In view of this, a variety of studies of temperature insensitive optical devices have been conducted.

One example of such studies is disclosed in a paper entitled "A Temperature Insensitive InGaAsP-InP Optical Filter" by H. Tanabe, et. al., IEEE Photonics Technology Letters, Vol. 8, No. 11, November 1996, pages 1489–1491 (Related Art 1). The filter, disclosed in this related art, is basically a Mach-Zehnder (MZ) interferometer consisting of two waveguides (or arms) that have different lengths and have different values for dn/dT, low and high. That is, the central wavelength of the filter varies depending on the temperature dependency of the optical path length of each of the two waveguides. Therefore, if the temperature coefficient of the difference between the optical path lengths is made identical, then it is possible to reduce the temperature dependency of the filter.

Another example of techniques pertinent to the present invention is disclosed in a paper entitled "Athermal silica-based arrayed-waveguide grating multiplexer" by Y. Inoue, et al., Electronics Letters, 6 th November 1997, Vol. 33, No. 23, pages 1945–1947 (Related Art 2). According to this Related Art 2, in view of the fact that the central wavelength of silica-based arrayed-waveguide grating (AWG) is affected by thermal dependency of the difference between the optical wavelengths of the arrayed-waveguides, a silicon adhesive having a negative thermal coefficient is used to form part of the arrayed-waveguide. As a result, with Related Art 2, a temperature insensitive AWG has been realized by solving the above-mentioned thermal dependency.

However, the techniques disclosed in both Related Art 1 and 2 is limited to the structure wherein the temperature dependent of the filter's central wavelength is affected by the temperature dependence of the difference between the optical path lengths.

Another known technique is disclosed in Japanese Laid-open Patent Application No. 10-246824 (Related Art 3) wherein a filter taking the form of asymmetrical directional coupler is discussed. More specifically, the temperature dependence of the filter's central wavelength is rendered negligible by equalizing, at a desirable central wavelength, the propagation constants and the thermal coefficients of effective refractive indices of two optical waveguides. However, this related art is undesirably limited to the application to the filter that takes the form of the asymmetrical directional coupler.

On the other hand, there have been proposed techniques for rendering zero or negligible the temperature dependence of the optical path length of the waveguide itself. These techniques will be described hereinafter.

FIG. 1 is a diagram schematically showing an optical waveguide 8 that is provided with a waveguide layer 10 formed on an appropriate substrate. As shown, the waveguide 8 has a path length L and comprises a cladding 14 and a core 16. Designating an equivalent refractive index of the waveguide layer as $n_{eq}$, then the optical path length S is given by $$S = n_{eq} \times L \quad (1)$$

The temperature dependence of the optical path length S (dS/dT) is obtained by differentiating equation (1) with respect to T. Although not clearly shown in FIG. 1, the substrate 12 is typically much thicker than that of the waveguide layer 10. Therefore, the coefficient of linear thermal expansion of the waveguide 8, which is represented by (1/L)(dS/dT), can be approximated to the coefficient of linear thermal expansion of the substrate 12 ($\alpha_{sub}$). As a result, the temperature dependence of the optical path length, which has been normalized by the waveguide length L, is given by $$(1/L)(dS/dT) = (dn_{eq}/dT) + n_{eq} \times \alpha_{sub} \quad (2)$$

In equation (2), the term of the left side (1/L)(dS/dT) is the temperature coefficient of the optical path length, and the first term of the right side ($dn_{eq}/dT$) is the thermal coefficient of the equivalent refractive index. If an optical waveguide, whose temperature coefficient of optical path length (viz., (1/L)(dS/dT)) is zero, is used then it is possible to realize an optical wavelength filter whose central wavelength is rendered independent of temperature.

In other words, in the case where the optical waveguide satisfies the following equation (3), the temperature dependence of the optical path length is rendered zero. Such an optical waveguide is called an athermal waveguide. That is, the athermal condition is given by $$(dn_{eq}/dT) + n_{eq} \times \alpha_{sub} = 0 \qquad (3)$$

In order to satisfy equation (3), it is necessary that the value of (1/L)(dS/dT) is negative while the value of $\alpha_{sub}$ is positive, or vice versa.

One example of an optical filter using an atermal waveguide is disclosed in a paper entitled "Athermal Narrow-Band Optical Filter at 1.55 μm Wavelength by Silica-Based Athermal Waveguide" by Y. Kokubun[,] et al., IEICE Trans. Electron., Vol. E81-C, No. 8, August 1998 (Related Art 4). The just-mentioned athermal optical filter is shown in FIG. 2. This athermal filter is provided with a core 20, a lower cladding 22, a substrate 24, an upper loaded cladding 26, and overcladding, 28. This overcladding 28 is made of PMMA (poly-Methyl-Methacrylate) and TFMA (Tri-fluoroethyl-Methacrylate), and accordingly, this known technique has encountered the difficulties because these materials are considerably inferior relative to the crystal materials in terms of heat resistance, moistureproof, strength, aging, etc.

SUMMARY OF THE INVENTION

It is therefore an object of the present to provide a temperature insensitive optical waveguide which is able to overcome the difficulties inherent in the known waveguides.

One aspect of the present invention resides in an optical waveguide comprising a substrate and a waveguide layer formed thereon, the waveguide comprising a core and a cladding whose refractive index is less than that of the core, characterized in that the substrate exhibits a negative coefficient of thermal expansion in the temperature range between 0° C. and 65° C.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 5 is a table showing known glass-ceramic articles in the ZnO—$Al_2O_3$—$SiO_2$ composition field, some of which can be used with the present invention;

FIG. 6 is a table showing known examples of substrate materials which can be used with the present invention;

DETAILED DESCRIPTION OF THE PREFERRED EMBODIMENTS

Figure 1:
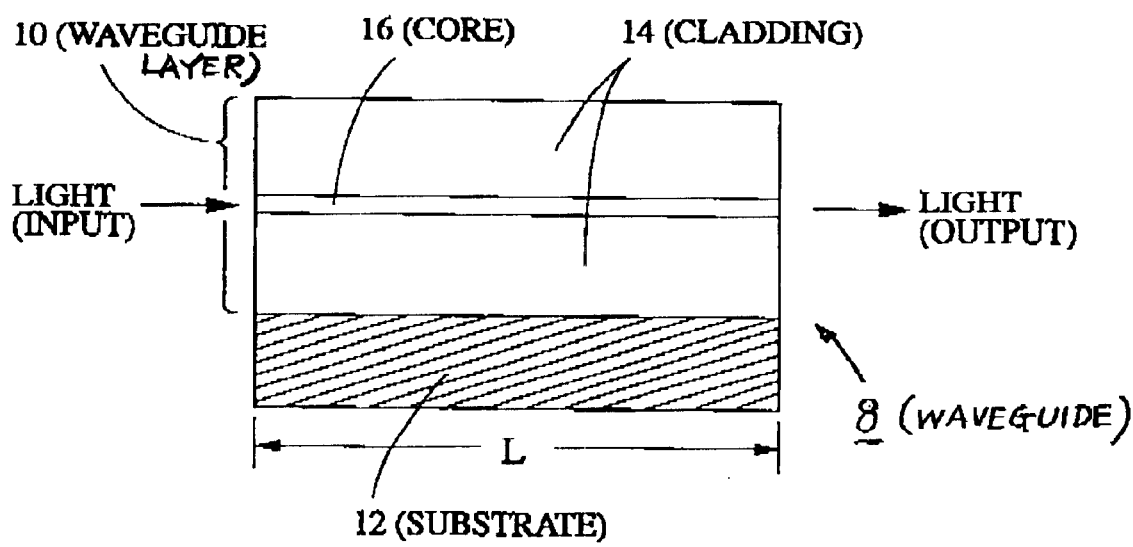
FIG. 1 is a diagram schematically showing a conventional optical waveguide which includes a waveguide layer formed on a substrate, to which the present invention is applicable.
Figure 2:
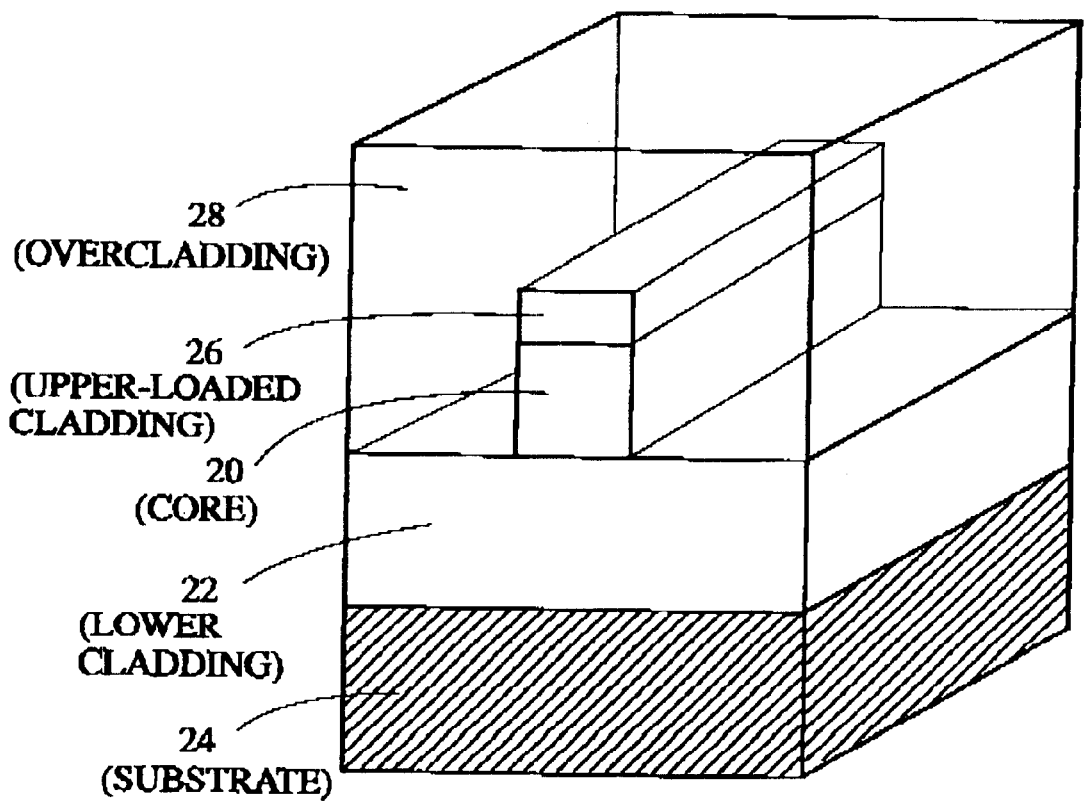
FIG. 2 is a diagram schematically showing a conventional waveguide.
Figure 3:
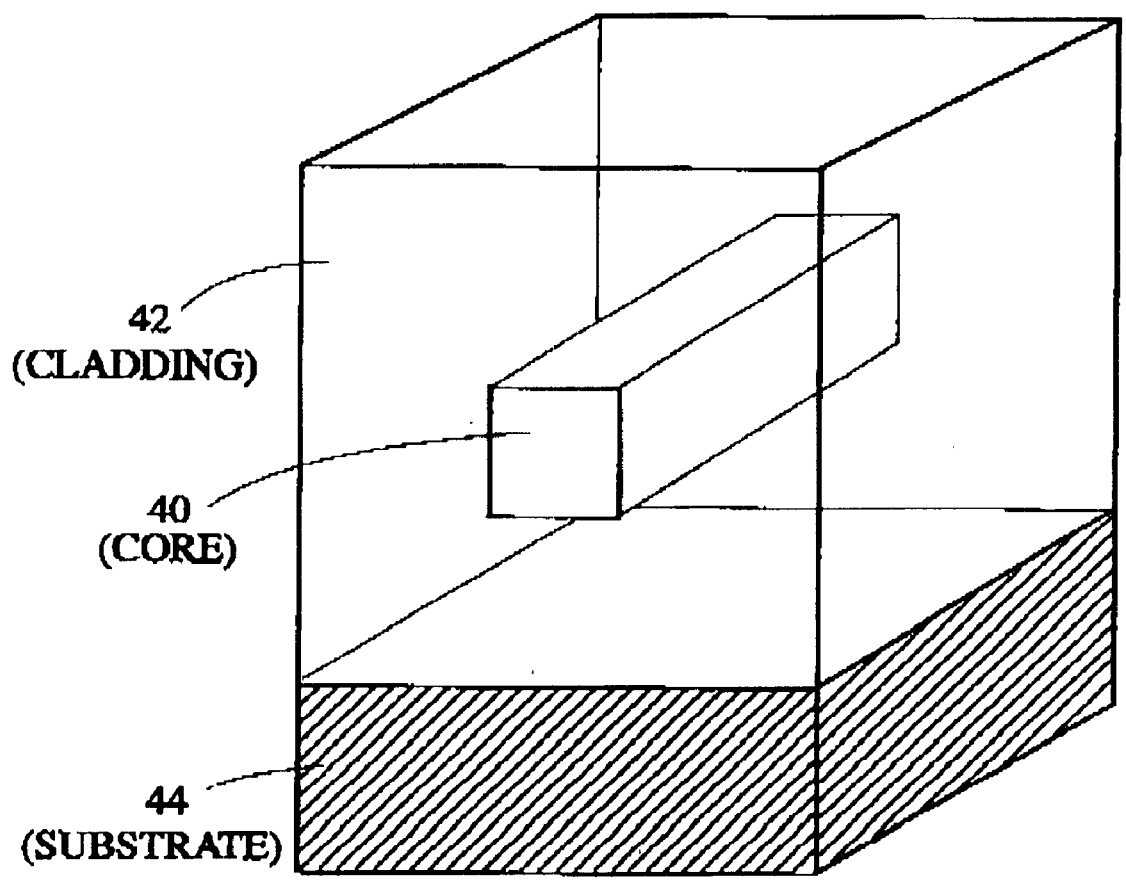
FIG. 3 is a diagram schematically showing an optical waveguide in accordance with the first embodiment of the present invention.

A first embodiment of the present invention will be described with reference to FIGS. 1 and 2. FIG. 1 shows an athermal waveguide according to the first embodiment of the present invention.

As shown in FIG. 1, the athermal waveguide comprises a substrate 44 having a negative coefficient of linear thermal expansion, a core 40, and a cladding 42. As shown, the waveguide takes the form of PLC (Planar Lightwave Circuit) in the instant embodiment. However, according to the present invention, the athermal condition is obtained by controlling a coefficient of linear thermal expansion of the substrate 44, the present invention is in no way limited to the PLC type waveguide. More specifically, it is possible to apply the present invention to a waveguide having an arbitrary cross section, such as slab type, ridge type, loaded type, etc.

In general, the substrate 44 can be made from a variety of materials on the condition that the coefficient of the linear thermal expansion of the substrate is negative and the surface of the waveguide can be smoothed. Examples of the materials each having a negative coefficient of thermal expansion are $TiO_2$—$SiO_2$ ($TiO_2$ doped quartz glass), crystallized glasses (glass-ceramics) such as $LiO_2$—$Al_2O_3$—$SiO_2$, $Al_2O_3$—$TiO_2$, etc. The thermal expansion coefficient of each of the above-mentioned materials can continuously be changed by varying the composition ratio thereof.

That is, with equation (1), if the values of $n_{eq}$ and $dn_{eq}/dT$ are known, it is practically possible to determine the value of $\alpha_{sub}$ which satisfies the athermal condition. More specifically, when a substrate with the value of $\alpha_{sub}$ satisfying the athermal condition is found, an athermal waveguide can be obtained by way of conventional manufacturing processes.

It is to be noted that the value of the right side of equation (1) is not necessarily required to be zero but is sufficient if taking a small absolute value equal to or less than $0.5 \times 10^{-5}$ or preferably equal to or less than $1 \times 10^{-6}$.

By way of example, in the case where the device is manufactured using a substrate of a conventional material such as quartz glass, the value of the right side becomes approximately $1 \times 10^{-5}$. If he value of the right side is reduced less than $0.5 \times 10^{-5}$, the temperature dependence of the waveguide can be halved.

It may be sufficient in practice that the temperature range wherein the coefficient of the thermal expansion exhibits a negative value falls within the range between 0–65° C.

In equation (1), if $n_{eq}=1.5$ and $dn_{eq}/dT=5\times 10^{-6}$, the athermal condition is satisfied if $\alpha_{sub}=-3.3\times 10^{-6}/° C$.

In the following, there will be described the examples of materials or articles, each of which has a negative coefficient of thermal expansion and thus is applicable to a substrate according to the present invention.

Figure 4:
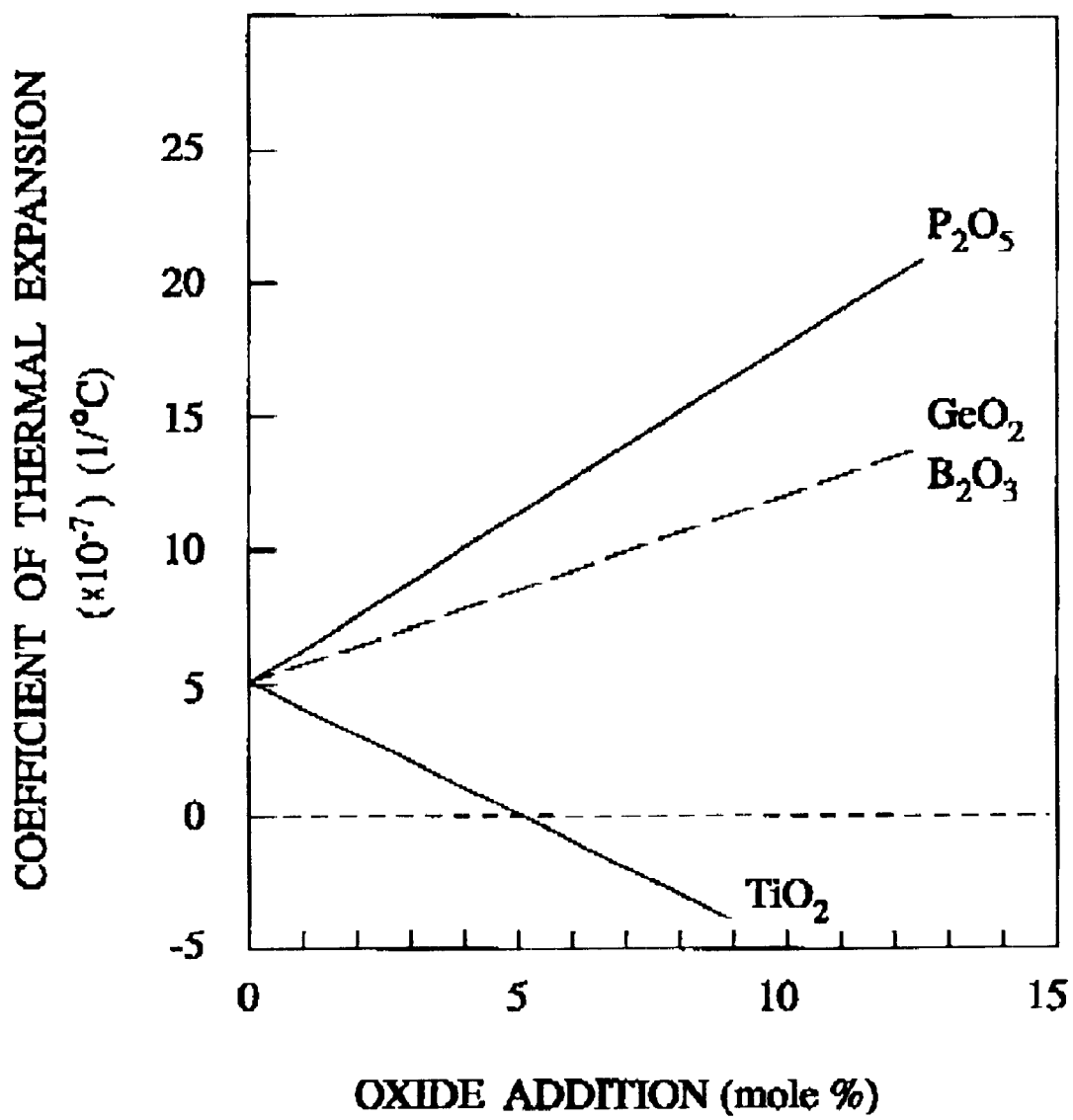
FIG. 4 is a graph showing thermal expansion of known doped silica glasses, which is presented for indicating an example of material which can be used with the present invention.

FIG. 4 is a graph showing a relationship between coefficients of thermal expansion of doped silica glasses and the amount of addition of each of four kinds of oxides FIG. 4 is extracted from a book entitled "Optical Fiber Telecommunications" by Stewart E. Miller, et al., Academic Press, 1979, on page 189 (Related Art 5). As shown in FIG. 4, silica glass doped with $TiO_2$ more than about 5.5 mole % exhibits a negative thermal expansion. Therefore, it is understood from FIG. 4 that, in order to obtain the abovementioned coefficient of thermal expansion (viz., $\alpha_{sub}$=−3.3×10$^{-6}$ (1/° C.)), $SiO_2$ is doped with $TiO^2$ by about 30%.

FIG. 5 is a table showing compositions, expressed in weight percent on the oxide basis, of thermally crystallizable glasses. FIG. 5 has been extracted from Japanese Laid-open Patent Application 2-208256 (Related Art 6). As shown in FIG. 5, there are shown a variety of amounts of $SiO_2$, $Al_2O_3$, and ZnO to obtain a crystalline glass-ceramic in the ZnO—$Al_2O_3$—$SiO_2$ composition field with zinc petalite and/or beta(β)-quartz solid solutions as the predominant crystal phases. As shown, each of the glass-ceramic articles of Sample Nos. 1–6 exhibits a negative coefficient of thermal expansion. It s apparent to be able to obtain a substrate suitable for use in the instant invention by appropriately selecting the proportions of $SiO_2$, $Al_2O_3$, and ZnO components.

The glass-ceramic with beta-quartz solid solution is one of the crystals of $SIO_2$, containing a small amount of lithium and/or aluminium, exhibiting a small density compared with other $SiO_2$ crystals and porous crystal structure. The glass-ceramic with beta-quartz solid solution, when heat treated in the range between 1100–1200° C., is transformed to glass-ceramic with beta-spodumene solid solution, which indicates a somewhat higher coefficient of thermal expansion relative to the glass-ceramic with beta-quartz solid solution.

Other than the above, many examples of substrate materials can be pointed out, each of which shows a negative coefficient of linear thermal expansion. Examples are the crystallized glasses in the $LiO_2$—$Al_2O_3$—$SiO_2$ and MgO—$LiO_2$—$Al_2O_3$—$SiO_2$ composition fields, the manufacturing method of which is well known in the art and thus, further description thereof will be omitted for brevity.

Further, as shown in FIG. 6. $LiO_2$—$Al_2O_3$—$2SiO_2$ (beta-eucryptite) indicates a negative coefficient of linear thermal expansion of −8.6×10$^{-6}$/° C. and, on the other hand, $Al_2O_3$—$TiO_2$ (aluminium Titanate) also exhibits a negative coefficient of linear thermal expansion of −1.9×10$^{-6}$(1/° C.).

Still further, many materials on the market can be used for the substrate according to the present invention. One example is "Neoceram N-0" (Trade name), available at Japanese company named Nippon Denki Gaishi, K. K., which belongs to a material of $LiO_2$—$Al_2O_3$—$SiO_2$ composition field and exhibits a negative coefficient of thermal expansion of −0.65×10$^{-6°}$ C. Still another example is "Miracrone PH-3" (Registered Trademark), available to Japanese company named Nippon Gaishi, K. K., which exhibits a negative coefficient of thermal expansion of −0.2×10$^{-6}$/° C.

The waveguide embodying the present invention can be fabricated so as to satisfy the athermal condition given by equation (3) even if the waveguide is straight, curved, branched, coupled, etc. Accordingly, it is understood that the optical device incorporating such a waveguide is able to have a function of resonating, reflecting, transmitting, or splitting a predetermined light wavelengh by way of interference or resonance with a light which is being transmitted through said optical waveguide.

Figure 7:
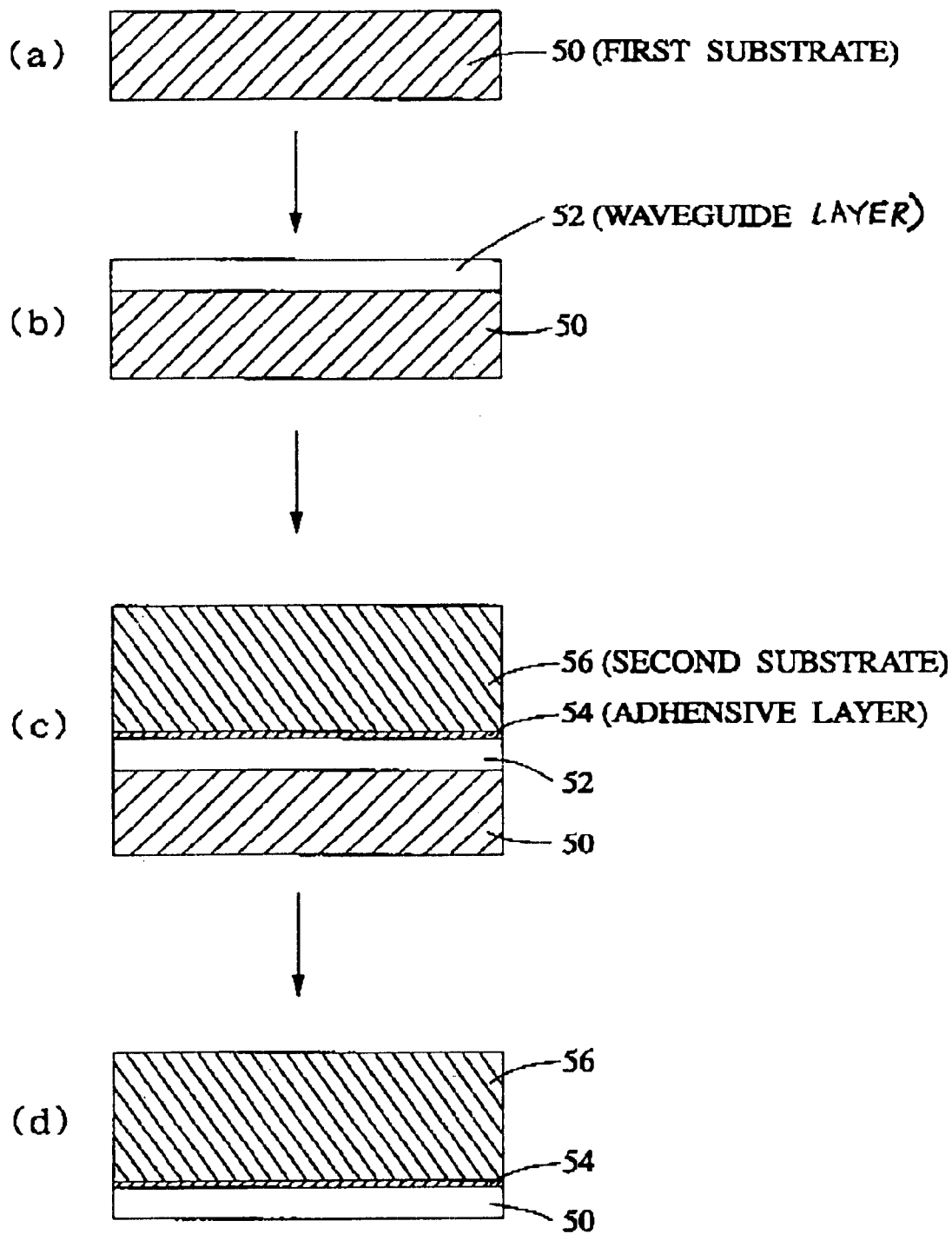
FIG. 7 is a diagram schematically showing a second embodiment of the present invention.

A second embodiment of the present invention will be described with reference to FIG. 7. The instant embodiment is concerned with a method of fabricating an athermal waveguide, which is provided with a waveguide layer formed on a semiconductor, without incurring warping and cracking due to a large difference between the substrate and the waveguide layer. More specifically, the second embodiment is to overcome any warping and cracking, which may otherwise arise while fabricating the device.

Initially, a first substrate 50 is prepared whose coefficient of thermal expansion is equal to or similar to that of a waveguide layer 52. Subsequently, the waveguide layer 52 is formed on the substrate 50. As mentioned above, the coefficients of thermal expansion of the first substrate 50 and the waveguide layer 52 are equal to or similar to with each other, it is free of the warping and/or cracking during the fabrication processes of waveguide layer deposition, annealing, cooling, etc. Subsequently, a second substrate 56 is prepared which satisfies the athermal condition given by equation (3). The second substrate 56 is fixed to or laminated on the major surface of the waveguide layer 52 by way of an adhesive layer. Lastly, the substrate 50 is removed so as to obtain a final product in this case.

The removal of the substrate 50 is carried out by using an appropriate technique such as polishing, wet etching, dry etching, etc. in consideration of the material, physical characteristics, thickness, etc. of the first substrate 50. For example, in the case where the substrate 50 is made of Si, wet-etching using KOH (for example) may be suitable. Further, If the substrate 50 is made of quartz glass, wet etching using hydrofluoric acid is typically utilized. In FIG. 7, although the substrate 50 is completely removed, it is allowed to leave a small amount of substrate 50 on the device. This may be advantageous in that there is room to control the temperature dependence of the device by controlling the amount of the substrate 50 left behind. In other words, a fine control of the temperature dependence of the device becomes possible by the amount of etching.

A third embodiment of the present invention will be described with reference to FIG. 8. The third embodiment has the same goal as the second embodiment. That is, the third embodiment is to provide a method of fabricating an athermal waveguide without incurring warping and cracking due to a large difference between the substrate and the waveguide layer.

Initially, first and second substrates 60 and 66 are prepared The first substrate 60 is provided with a coefficient of thermal expansion which is equal to or similar to that of a waveguide layer 62. On the other hand, the second substrate 66 should satisfy the athermal condition given by equation (3) as in the second embodiment.

Figure 8:
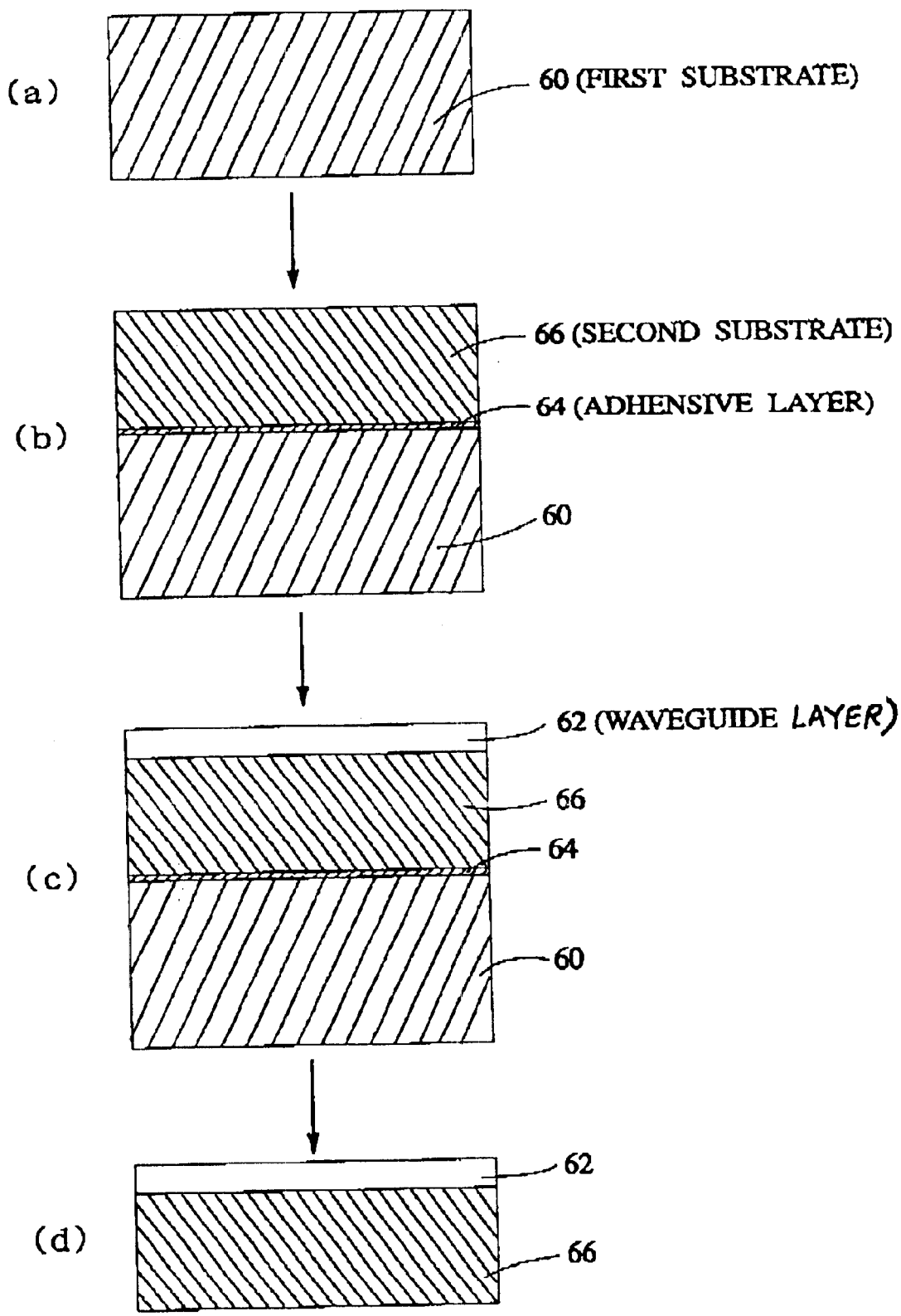
FIG. 8 is a diagram schematically showing a third embodiment of the present invention.

Subsequently, as shown in FIG. 8, the first and second substrates are bonded together using an appropriate adhesive layer 64. In the instant embodiment, the first substrate 60 is much thicker than the second substrate 66. As a result, the coefficient of thermal expansion of the two bonded substrates is determined by that of the thicker substrate 60. That is, the thermal expansion of the bonded substrates is controlled so as to equal to or similar to that of a waveguide layer 62 If the ratio of the thicknesses of the substrates 60 and 66 is controlled, it is possible to more precisely approach the thermal expansion of the bonded substrates to that of the waveguide layer 62. After the substrates 60 and 66 are bonded, the waveguide layer 62 is formed on the surface of the second substrate 66, which surface is opposite to the first substrate 60.

As mentioned above, the thermal expansion of the bonded substrates is mainly determined by that of the first substrate 60. It is therefore possible to obviate the undesirable occurrences of warping and/or cracking which may otherwise be introduced during the fabrication processes of waveguide layer deposition, annealing, cooling, etc. Subsequently, the first substrate 60 is removed using the same technique as referred to in the second embodiment. Following this, the adhesive layer 64 is removed or washed away using a solvent of the adhesive used for the layer 64.

The optical waveguide, which embodies the present invention, is applicable to a variety of optical devices such as shown in FIGS. 9 to 13. Since the optical devices shown in FIGS. 9 to 13 are well known in the art, they are briefly described for the sake of simplifying the disclosure.

Figure 9:
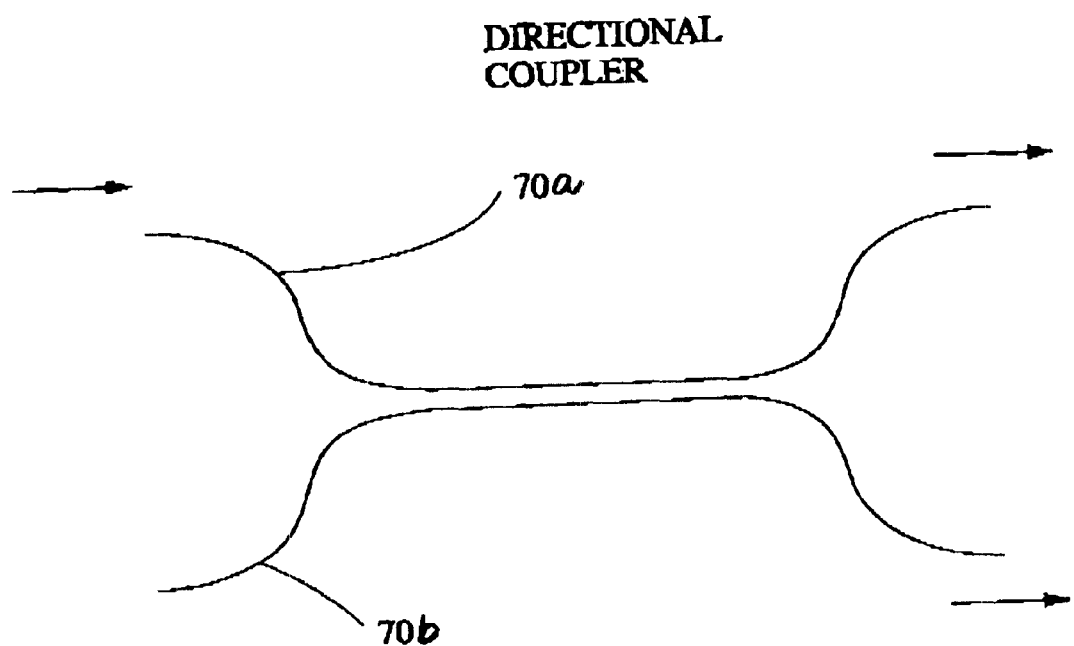
FIG. 9 is a sketch showing a directional coupler to which the present invention is applicable.
Figure 10:
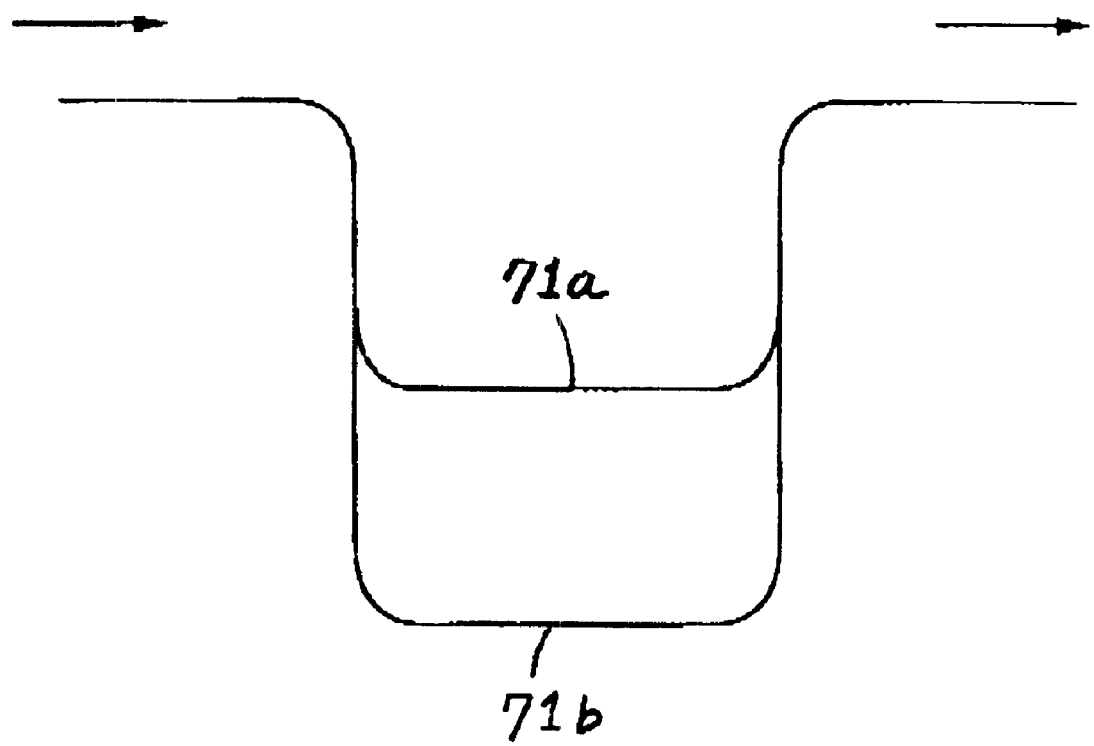
FIG. 10 is a sketch showing a Mach-Zhender interferometer to which the present invention is applicable.
Figure 11:
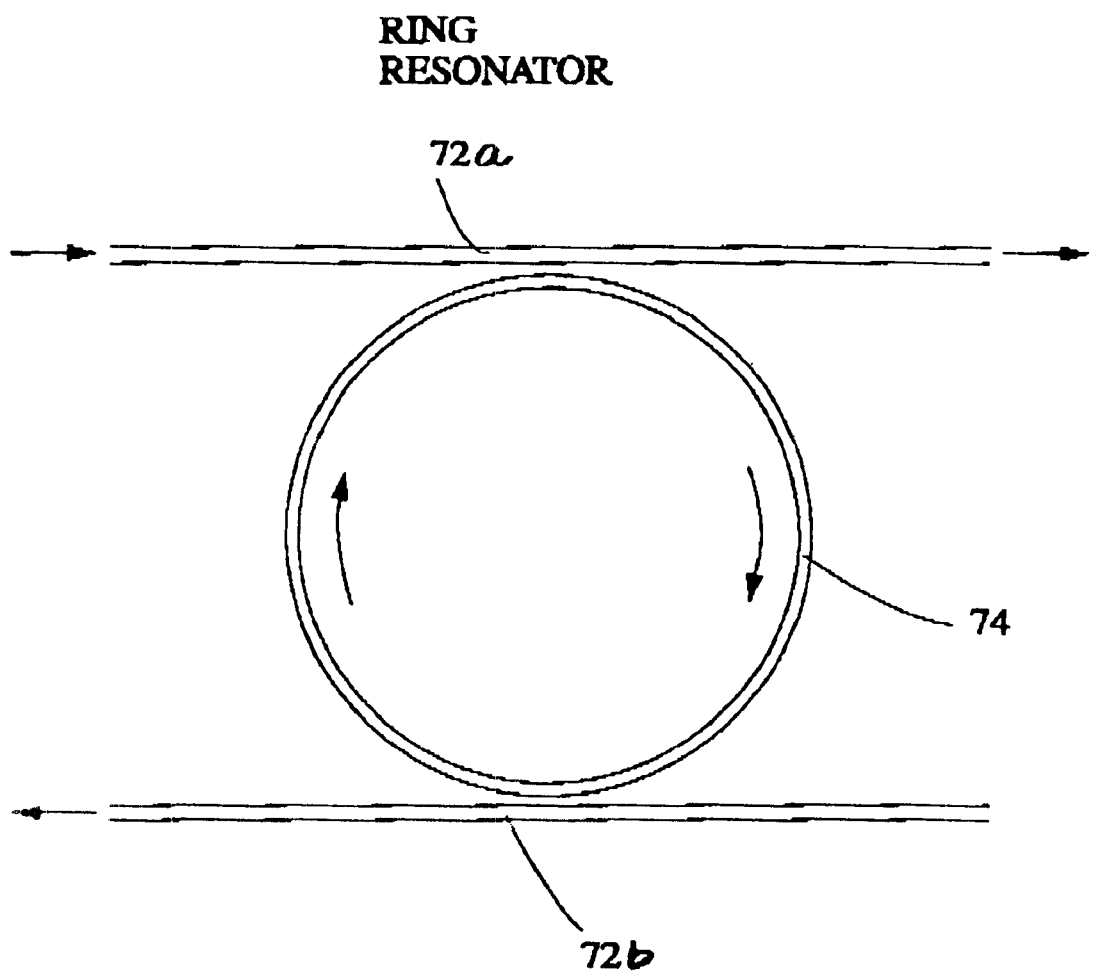
FIG. 11 is a sketch showing a ring resonator to which the present invention is applicable.
Figure 12:
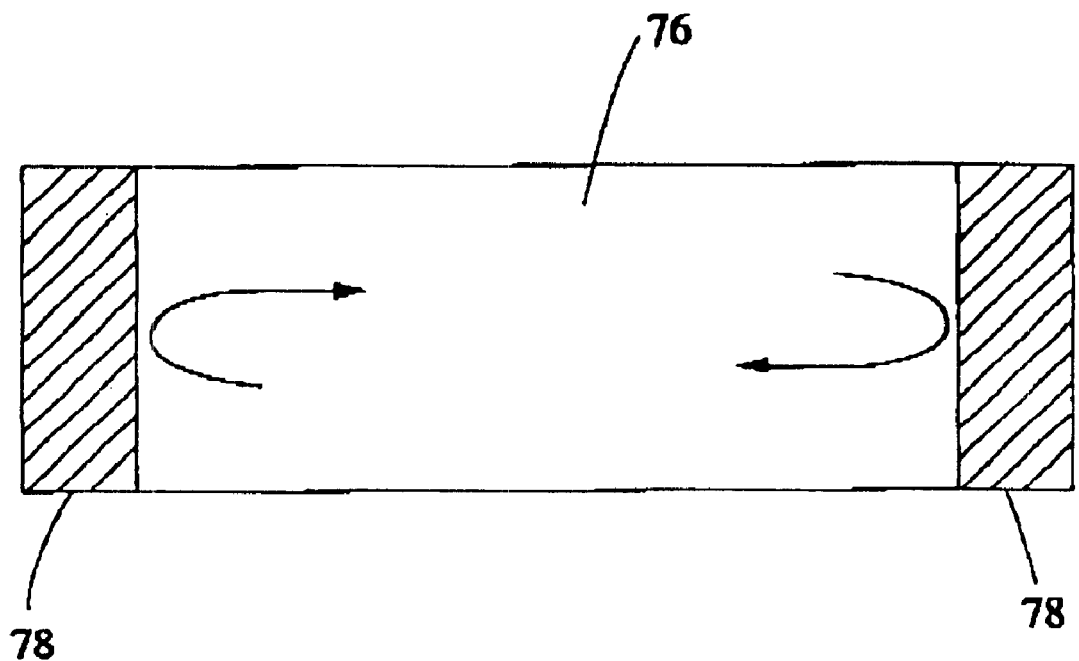
FIG. 12 is a sketch showing a Febry-Perot resonator to which the present invention is applicable.
Figure 13:
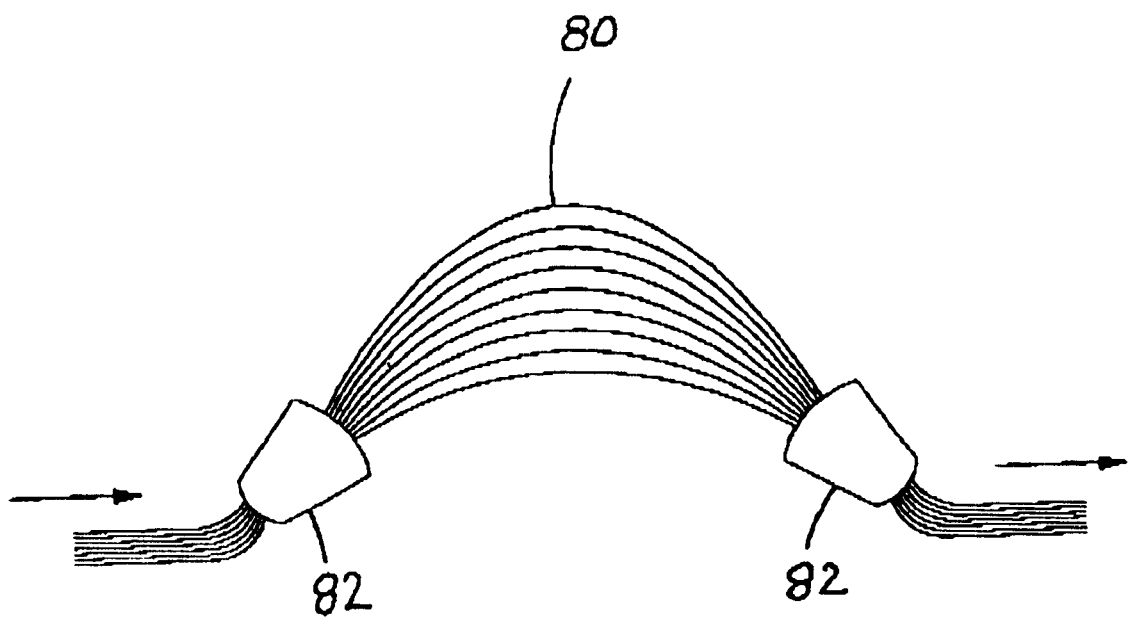
FIG. 13 is a sketch showing an arrayed-waveguide grating to which the present invention is applicable.

A directional coupler illustrated in FIG. 9 is to utilize the transfer of light power between two waveguides 70a and 70b which have portions arranged side by side in the order of light wavelengh. FIG. 10 is a drawing schematically showing a Mach-Zehnder interferometer having two light waveguides 71a and 71b with different optical path lengths. On the other hand, FIG. 11 illustrates a ring resonator wherein a light wave transmitting through an upper waveguide 72a is extracted, through resonance, at a ring waveguide 74 and then applied to a lower waveguide 72b. FIG. 12 is sketch schematically showing a Fabry-Perot resonator comprising a waveguide 76 and two mirrors 78 provided at the end faces of the waveguide 76. Lastly, FIG. 13 is a schematic illustration of an arrayed-waveguide grating (AWG) which comprises arrayed waveguides 80 and slab waveguide lens 82.

While the foregoing description describes three possible embodiments of the present invention, the various alternatives and modifications are possible without departing from the scope of the present invention. For example, it is possible to provide a grating(s) on the surface of the substrate, in the cladding layer, or in the core. Further, the present invention is applicable to a grating which forms part of a DBR (Distributed Bragg Reflector), thereby rendering it possible to make the laser's oscillating wavelengh independent of temperature. In this case, the above-mentioned grating formed in the athermal waveguide is connected to the endface of the laser.

What is claimed is:

1. An optical waveguide comprising a substrate and a waveguide layer formed thereon, said waveguide comprising a core and a cladding whose refractive index is less than that of said core, wherein said substrate exhibits a negative coefficient of thermal expansion in the temperature range between 0° C. and 65° C., and wherein said substrate is made of glass-ceramic selected from the group consisting of zinc petalite, beta-quartz, and beta-spodumene.

2. The optical waveguide as claimed in claim 1, wherein said substrate is manufactured such as to satisfy the following equation $$dn_{eq}/dT + n_{eq} \times \alpha_{sub} = 0$$

where $n_{eq}$ represents an equivalent refractive index of said waveguide layer, $dn_{eq}/dT$ represents a temperature change of said equivalent refractive index, and $\alpha_{sub}$ the coefficient of thermal expansion of the substrate.

3. The optical waveguide as claimed in claim 1 or 2, wherein said substrate is made of a quartz glass into which $TiO_2$ is doped with an amount equal to or more than 5.5 mole %.

4. The optical waveguide as claimed in claim 1, wherein said substrate is made of glass-ceramic with beta-quartz solid solution.

5. The optical waveguide as claimed in claim 1, wherein said substrate is made of glass-ceramic with beta-spodumene solid solution.

6. The optical waveguide as claimed in claim 1, wherein said substrate is made of crystallized glass in a ZnO—$Al_2O_3$—$SiO_2$ composition field.

7. The optical waveguide as claimed in claim 1, wherein said substrate is made of crystallized glass in a $LiO_2$—$Al_2O_3$—$SiO_2$ composition field.

8. The optical waveguide as claimed in claim 1 wherein said substrate is made of crystallized glass in a $Al_2O_3$—$TiO_2$ composition field.

9. The optical waveguide as claimed in claim 1, wherein said substrate is made of crystallized glass in a MgO—$LiO_2$—$Al_2O_3$—$SiO_2$ composition field.

10. The optical waveguide as claimed in claim 1, wherein said substrate is made of CsCl.

11. An optical device incorporating therein the optical waveguide comprising a substrate and a waveguide layer formed thereon, said waveguide comprising a core and a cladding whose refractive index is less than that of said core, wherein said substrate exhibits a negative coefficient of thermal expansion in the temperature range between 0° C. and 65° C., and wherein said said substrate is made of glass-ceramic selected from the group consisting of zinc petalite, beta-quartz, and beta-spodumene, wherein said optical device has a function of resonating, reflecting, transmitting, or splitting a predetermined light wavelength by way of interference of resonance with a light which is being transmitted through said optical waveguide.

12. The optical device as claimed in claim 11, wherein said optical device is a directional coupler.

13. The optical device as claimed in claim 11, wherein said optical device is a Mach-Zehnder interferometer.

14. The optical device as claimed in claim 11, wherein said optical device is a ring resonator.

15. The optical device as claimed in claim 11, wherein said optical device is a Fabry-Perot resonator.

16. The optical device as claimed in claim 11, wherein said optical device is an arrayed-waveguide grating device.

17. The optical device as claimed in claim 11, wherein said optical waveguide is provided with a grating within said optical waveguide.

18. The optical device as claimed in claim 11, wherein said optical device is applied to a Distributed Bragg Reflector.

19. A method of fabricating an optical waveguide on a substrate, comprising the steps of:
    forming said optical waveguide on one major surface of a first substrate whose coefficient of thermal expansion is equal to or close to a coefficient of thermal expansion of said optical waveguide;
    forming a second substrate on said optical waveguide by way of an adhesive layer, said second substrate having a coefficient of thermal expansion is zero or negative; and
    removing said first substrate.

20. A method of fabricating an optical waveguide on a substrate, comprising the steps of:
    laminating a first and second substrates by way of an adhesive layer, said first substrate having a coefficient of thermal expansion equal to or close to a coefficient of thermal expansion of said optical waveguide, and said second substrate having a coefficient of thermal expansion which is zero or negative;
    forming said optical waveguide on said second substrate; and
    removing said first substrate and said adhesive layer.

21. The method as claimed in claim 20, wherein said first substrate is thicker than said second substrate.

* * * * *